March 1, 1949.　　　A. J. ROATH　　　2,463,207

GATE CONSTRUCTION

Filed Oct. 10, 1946

Inventor
A. J. Roath
By C. A. Knowles
Attorneys.

Patented Mar. 1, 1949

2,463,207

UNITED STATES PATENT OFFICE 2,463,207

GATE CONSTRUCTION

Arthur J. Roath, Wheatland, Wyo.

Application October 10, 1946, Serial No. 702,432

1 Claim. (Cl. 160—211)

This invention relates to farm gates, the primary object of the invention being to provide a farm gate or sales gate having a slidable section which may be operated from either side of the gate for providing an opening to permit animals to pass through the gate singularly, the sliding section being capable of preventing animals from passing through the gate, at the will of the operator. Another object of the invention is to provide a gate wherein the movable section thereof may be moved to its closed position, and the gate operated in the usual way.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed:

Referring to the drawing.

Figure 1:
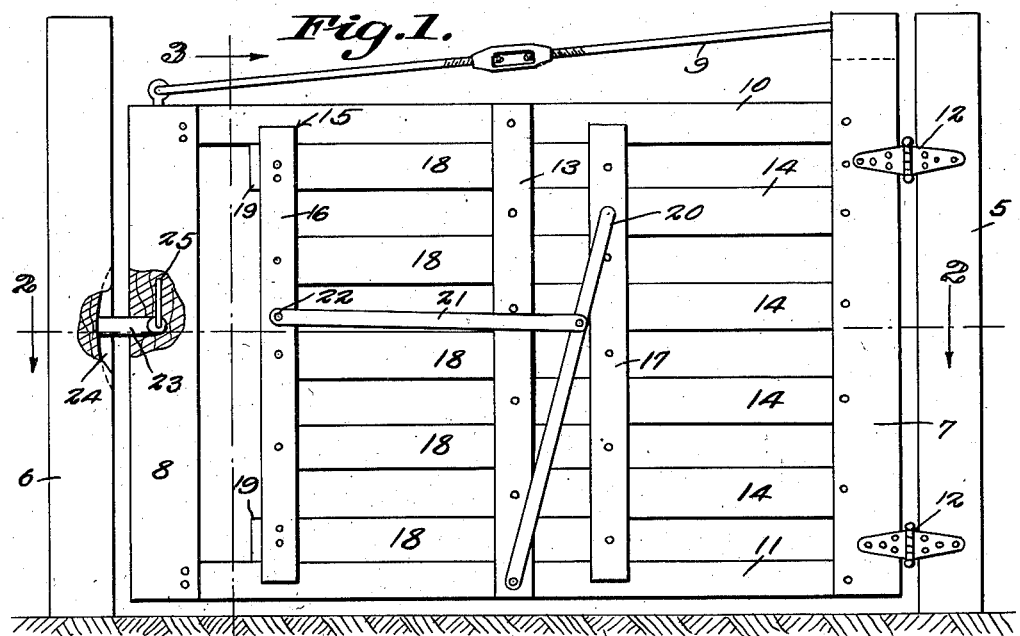
Fig. 1 is an elevational view of a gate, constructed in accordance with the invention.
Figure 2:
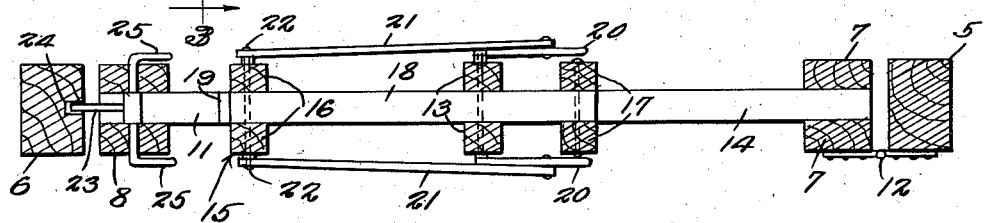
Fig. 2 is a horizontal sectional view taken on line 2—2 of Fig. 1.
Figure 3:
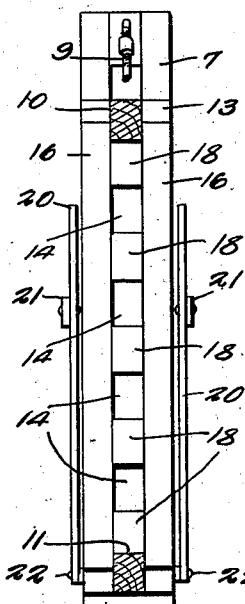
Fig. 3 is a vertical sectional view taken on line 3—3 of Fig. 1.

Referring to the drawing in detail, the reference character 5 indicates the gate posts to which the gate is hingedly connected.

The reference character 6 indicates the gate post to which the keeper is usually secured, the gate proper, operating between the gate posts 5 and 6, as clearly shown by the drawing.

The gate proper includes a head bar 7 and foot bar 8, the head bar 7 being somewhat longer than the bar 8, so that the truss rod 9, which is secured to the foot bar 8, may be secured to the head bar at a point above the upper end of the foot bar, so that the truss rod may be operated to accomplish its purpose.

The head bar 7 and foot bar 8 of the gate, are connected by the upper horizontal bar 10 and the lower horizontal bar 11, the head bar 7 being connected to the gate post 5, by means of the hinges 12.

Vertical bars 13 are disposed at points intermediate the ends of the gate proper, and are arranged on opposite sides of the horizontal bars 10 and 11, the vertical bars 13 providing supports for the horizontal bars 14 that are arranged in vertical spaced relation with respect to each other, in forming the main portion of the gate.

The gate also includes a movable gate section indicated generally by the reference character 15, the movable gate section embodying pairs of vertical spaced bars 16 which are disposed on opposite sides of the bars 10 and 11, the bars 16 being sufficiently long to overlap portions of the bars 10 and 11. The movable gate section also includes spaced bars 17 that move on opposite sides of the horizontal bars 14, the ends of the bars 17 overlapping the bars 10 and 11, as do the bars 16.

The vertical bars 16 and 17 are connected by the bars 18 that are arranged in vertical spaced relation with respect to each other, the forward ends of the upper and lower bars 18 being extended beyond the bars 16, providing the extensions 19 that are adapted to move between the foot bar 8, to brace the movable gate section.

The bars 18 move between the vertical bars 13 so that the movable gate section is not only guided in its movements longitudinally of the main gate, but it is braced against strains directed thereto from the sides of the gate.

On each side of the gate, is an operating lever 20 which has pivotal connection with one of the bars 13, at the lower ends of the operating levers.

Connected with each operating lever 20, is a link 21, the links 21 being pivotally connected with the vertical spaced bars 16 of the movable gate section, at 22.

From the foregoing it will be seen that due to this construction, by moving the operating levers 20, the movable gate section may be slid from its opened to its closed position, or vice versa. It will also be noted that the movable gate section may be operated from either side of the gate, and the movable gate section moved to provide a space only large enough for animals to pass therethrough singularly.

The reference character 23 indicates a pivoted latch member which is carried by the foot bars 8, and is adapted to swing into the keeper 24 formed in the inner surface of the gate post 6. Handles 25 are formed on the latch and afford means whereby the latch may be operated from either side of the gate.

What is claimed:

A farm gate comprising a main swinging section including a head bar and a foot bar, upper and lower horizontal bars connecting the head bar and foot bar, a central vertical bar connected with the upper and lower horizontal bars, vertically spaced horizontal bars connecting the head bar and central vertical bar, a sliding gate section embodying spaced vertical end bars, vertically spaced horizontal bars connecting the spaced vertical end bars, said horizontal bars sliding on the adjacent horizontal bars of the main swinging section, the ends of said end bars of the sliding gate section resting against the side faces of the upper and lower horizontal bars of the swinging gate section guiding the sliding gate section in its movements longitudinally of the main swinging gate section, and the outer end of the sliding gate section being engageable with the foot bar of the main gate section closing the space between the vertical central bar and foot bar of the main gate section.

ARTHUR J. ROATH.

REFERENCES CITED

The following references are of record in the file of this patent:

UNITED STATES PATENTS

| Number | Name | Date |
|---|---|---|
| 398,861 | Stewart | Mar. 5, 1889 |
| 649,134 | Mathews | May 8, 1900 |
| 675,493 | Miller | June 4, 1901 |
| 1,132,438 | Carr | Mar. 16, 1915 |